United States Patent
Otterbach et al.

(10) Patent No.: US 7,154,871 B2
(45) Date of Patent: Dec. 26, 2006

(54) TRANSMITTING AND RECEIVING DEVICE FOR A MULTIPOINT-TO-POINT NETWORK

(75) Inventors: Jürgen Otterbach, Stuttgart (DE); Hardy Halbauer, Ettlingen (DE); Gabriele Schwoerer, Weil der Stadt (DE); Peter Jaenecke, Straubenhardt (DE)

(73) Assignee: Alcatel, Paris (FR)

( * ) Notice: Subject to any disclaimer, the term of this patent is extended or adjusted under 35 U.S.C. 154(b) by 951 days.

(21) Appl. No.: 09/810,249

(22) Filed: Mar. 19, 2001

(65) Prior Publication Data

US 2001/0038618 A1 Nov. 8, 2001

(30) Foreign Application Priority Data

Mar. 20, 2000 (DE) .............................. 100 13 678

(51) Int. Cl.
*H04B 7/216* (2006.01)
(52) U.S. Cl. .................. 370/335; 370/342; 370/441
(58) Field of Classification Search ................ 370/335, 370/320, 342, 350, 515, 507, 514, 208, 203, 370/206, 503, 584, 385, 351, 352, 353, 354, 370/355, 356, 401, 431, 432, 463, 467, 389, 370/392; 375/130, 136; 1/135, 140, 145, 1/146, 149, 150; 455/69; 310/514; 379/229, 379/230, 221.09, 221.08, 221.1, 221.11, 220.01
See application file for complete search history.

(56) References Cited

U.S. PATENT DOCUMENTS 5,715,521 A * 2/1998 Fukasawa et al. ............ 455/69
5,790,591 A * 8/1998 Gold et al. .................. 375/142
6,301,288 B1 * 10/2001 Molev-Shteiman ......... 375/140
6,310,856 B1 * 10/2001 Taipale ....................... 370/208
6,353,604 B1 * 3/2002 Grimwood et al. ......... 370/335
6,535,500 B1 * 3/2003 Su ............................. 370/342
6,611,512 B1 * 8/2003 Burns ......................... 370/342
6,700,881 B1 * 3/2004 Kong et al. ................. 370/335
6,717,930 B1 * 4/2004 Sezgin et al. ............... 370/335

FOREIGN PATENT DOCUMENTS

DE 199 28 019 A1 1/2001
EP 0 678 991 A2 10/1995

* cited by examiner

*Primary Examiner*—Chi Pham
*Assistant Examiner*—Justin M. Philpott
(74) *Attorney, Agent, or Firm*—Sughrue Mion, PLLC

(57) ABSTRACT

A synchronization procedure for a multipoint-to-point CDMA network (2), which minimizes the influence on the information transmission. Instead of interleaving communications and synchronization signals timewise, a simultaneous emission is proposed, in which the synchronization signals are superimposed on the communications signals. The synchronization signals are coded with a special synchronization code (6), which does not correspond to the CDMA communications code of the information signals, e.g Barker code. In addition, the synchronization signals are sent at a lower amplitude compared with the communications signals. The synchronization signals are also modulated (7) prior to sending, in particular using alternating multiplication by +1 and −1. On the receiving side (3), the synchronization signals are detected by demodulation (12; 15), correlation (13; 16) and subsequent accumulation. The transmission capacity for the communications signals is maximized by this procedure and the influence of the synchronization signals on the communications signals minimized.

Figure 1:
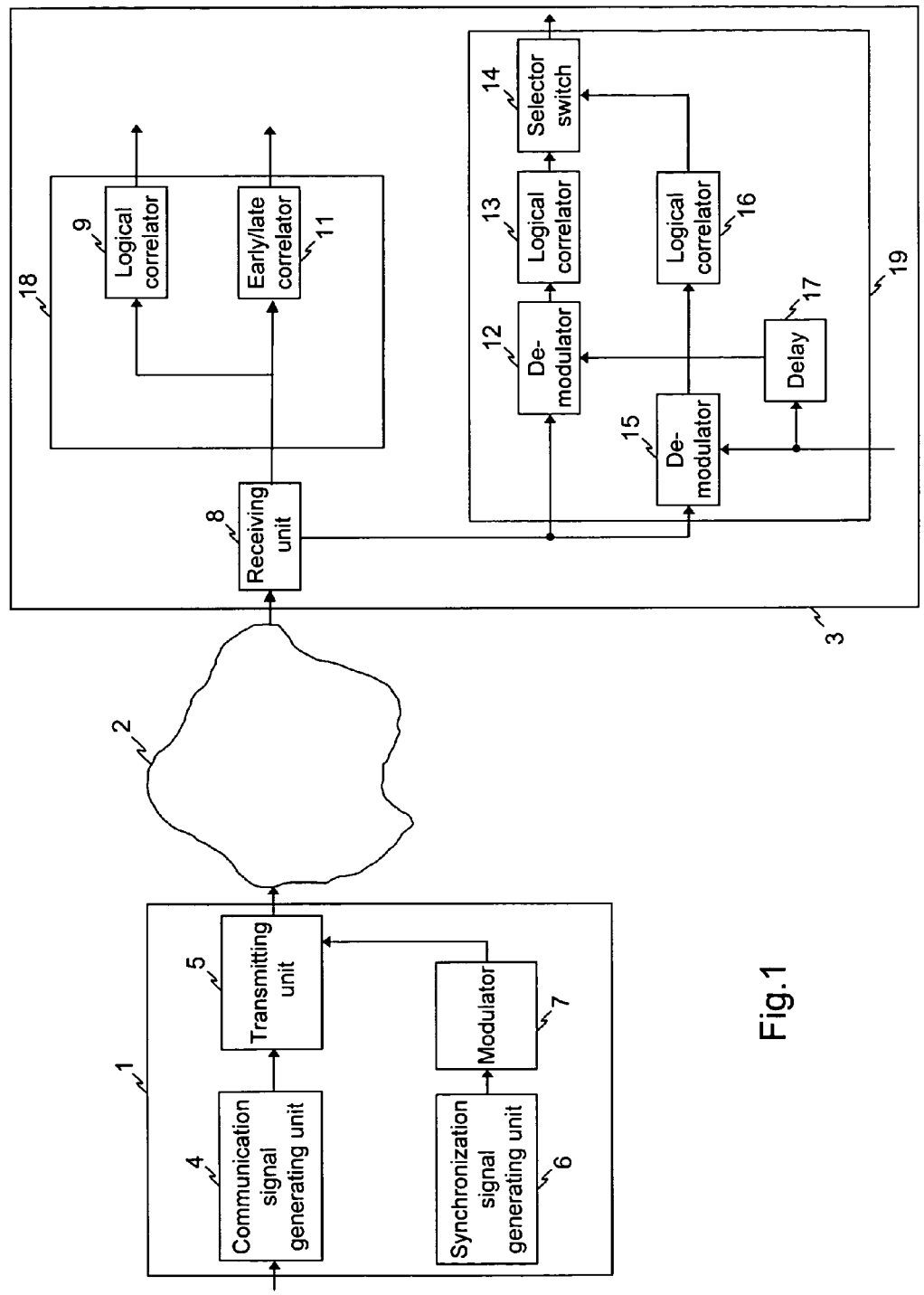

6 Claims, 2 Drawing Sheets

TRANSMITTING AND RECEIVING DEVICE FOR A MULTIPOINT-TO-POINT NETWORK

BACKGROUND OF THE INVENTION

The invention relates to a transmitting and a receiving device for a multipoint-to-point network, in particular a synchronous multipoint-to-point CDMA network, according to the preamble of claim 1 or the preamble of claim 3 and to a synchronization procedure for a multipoint-to-point network according to the preamble of claim 10.

Multipoint-to-point networks, in particular multipoint-to-point CDMA networks, can be used advantageously to implement back channels in interactive communications networks. Interactive communications networks are executed for example as so-called HFC networks or HFR networks; HFC=Hybrid Fibre Coax, HFR=Hybrid Fibre Radio. For the forward channel, a point-to-multipoint network is used, which contains an optical feeder line plus a coaxial cable network or radio network connecting thereto. For the back channel, use is being made increasingly of a multipoint-to-point network, e.g. a CDMA network, which can be formed optically, electrically or as a radio network as well as in mixed forms; CDMA=Code Division Multiple Access.

In a synchronous CDMA network with an exchange and a plurality of terminal stations, it is also the case that the terminal stations have to be synchronized to the clock pulse (master clock) of the exchange in frequency and phase. The clock pulse of the exchange is transmitted via the forward channel to the terminal stations, which each execute frequency synchronization by means of a PLL (Phase Locked Loop) and phase synchronization with phase correction to generate their individual clock pulse. To lock on, each terminal station transmits a synchronization signal via the back channel of the CDMA multipoint-to-point network to the exchange.

A synchronization procedure is already known in which synchronization signals are transmitted CDMA-coded to the exchange. Here the back channel is divided timewise into a first area, which is reserved for the transmission of information signals, and a second area, which is reserved for the transmission of synchronization signals. The second area is thus not available for information transmission, due to which the existing transmission capacity is not optimally utilized.

SUMMARY OF THE INVENTION

The object of the invention is therefore to provide a synchronization procedure which minimizes the influence on information transmission and thereby better utilizes the existing transmission capacity.

This object is achieved by a transmitting and a receiving device according to claim 1 or claim 3 and a synchronization procedure according to claim 10.

Instead of interleaving communications and synchronization signals timewise, a simultaneous emission is proposed, in which the synchronization signals are superimposed on the communications signals. The synchronization signals are encoded for example with a special synchronization code, which does not correspond to the CDMA communications code of the information signals. In addition or alternatively, the synchronization signals are emitted with a lower signal level compared with the communications signals, so as not to interfere excessively with the transmission of the communications signals. The coded synchronization signals are modulated before being sent. Modulation is carried out for example using alternating multiplication by +1 and −1. This has the advantage that several synchronization signals sent out consecutively in time do not on average generate any DC-offset, i.e. the direct current portion is equal to zero. The influence of the synchronization signals on the communications signals is thereby minimized. On the receiving side, the synchronization signals are detected by demodulation, e.g. using alternating multiplication by +1 and −1, and subsequent correlation with integrated accumulation. The alternating multiplication by +1 and −1 is executed at a rate which corresponds to the symbol clock pulse of the communications signals. Since the synchronization signals can be sent at any time, in particular not synchronized with the demodulator on the receiving side, it can happen that the synchronization signals arrive on the receiving side at a time at which the changeover from +1 to −1 or from −1 to +1 is taking place. To guarantee that the synchronization signals are detectable even in this case, the possibility has been created of demodulation on at least two different occasions, which lie apart by a preset period of time, e.g. half a clock pulse period.

The transmission capacity for the communications signals is maximized by this procedure. Time gaps/areas no longer have to be kept free in the back channel for locking on; the communications signals can be emitted continuously. The lock-on time is also reduced due to the fact that firstly, a time gap/area no longer has to be awaited in which transmission of the synchronization signals has to take place, but on the contrary synchronization signals can now be emitted at any time.

Secondly, the hardware outlay for detecting the synchronization signals can be reduced due to the use of a special synchronization code, which is considerably shorter than the CDMA communications code.

The negative influence of the synchronization signals on the information signals can be minimized by control of the signal level, e.g. online, taking account of the actual signal-to-noise ratios.

The invention can be used in principle in all networks in which first and second signals are transmitted simultaneously and in which the influence of the second signals on the first signals is to be minimized.

Advantageous configurations are to be inferred from the dependent claims.

BRIEF DESCRIPTION OF THE INVENTION

Two practical examples of the invention are explained below with the aid of two figures.

Figure 2:
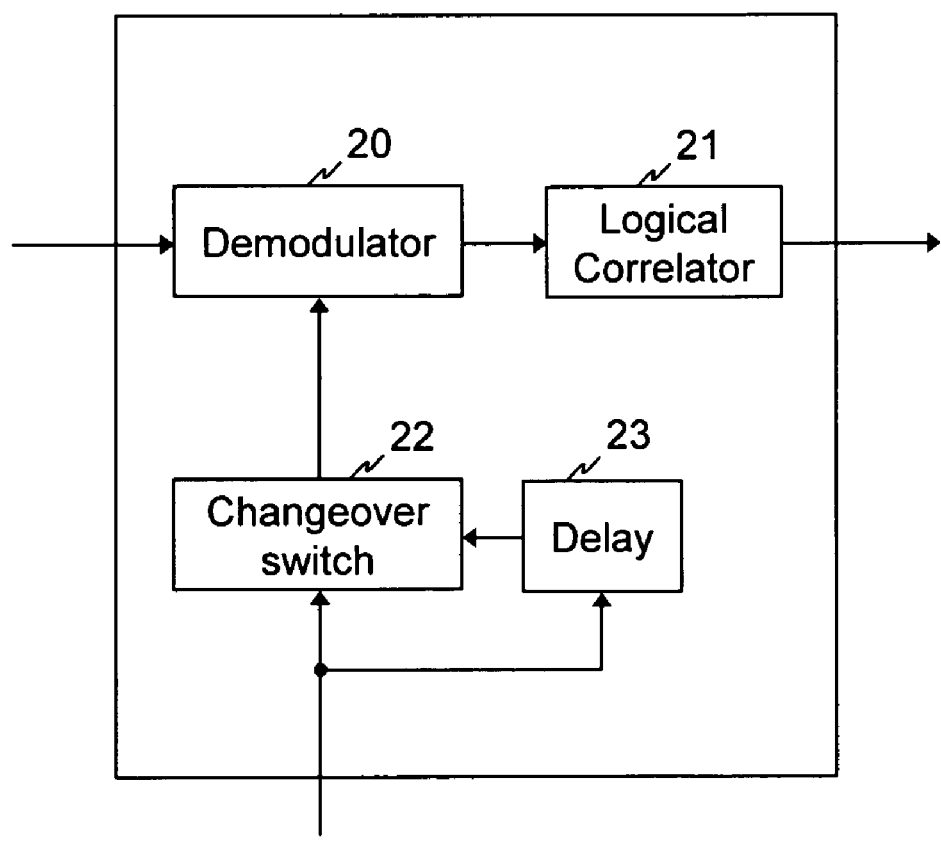

FIG. 1 shows a diagrammatical representation of a CDMA multipoint-to-point network according to the invention and FIG. 2 shows a diagrammatical representation of a part of a receiving device according to the invention.

DETAILED DESCRIPTION OF THE INVENTION

The first practical example is now explained with the aid of FIG. 1. FIG. 1 shows a CDMA multipoint-to-point network 2 with a transmitting device 1 according to the invention and a receiving device 3 according to the invention. The CDMA multipoint-to-point network 2 represents that part of an interactive communications network which is provided for implementing the back channel. For the forward channel of the interactive communications network, which is provided for the transmission of broadband information, such as television signals, video signals, control signals, from an exchange to several terminal stations, no diagrammatical representation is shown for reasons of clarity. The forward channel can be implemented for example by a hybrid network, which starting out from the exchange links the terminal stations to one another via a distribution network of optical glass fibre cables and optical splitters to form a point-to-multipoint network. Instead of optical cables, electrical ones can also be used, or a radio network as well as a mixed form of the aforementioned. So-called ONUs, BONTs or BSs are used at the interfaces: ONU=Optical Network Unit, BONT=Broadband Optical Network Termination, BS=Base Station.

Instead of two separate networks for the forward channel and the back channel, one and the same physical network can also be used bidirectionally for both the forward and back channel. The network is then constructed for example of optical cables, a different wavelength to that of the back channel normally being used for the forward channel.

The CDMA multipoint-to-point network 2 thus represents one possibility for implementing a back channel of an interactive communications network.

The transmitting device 1 is part of a terminal station. Each terminal station connected to the CDMA multipoint-to-point network 2 contains a transmitting device, which corresponds to the transmitting device 1.

The exchange, which is normally also described as the head end, contains the receiving device 3, which is used to receive the communications signals emitted by the terminal stations, e.g. request signals for the transmission of video films, so-called video on demand, or web pages from the Internet, and the synchronization signals emitted by the terminal stations. The exchange also contains a control unit, which takes on processing of the signals received from the terminal stations. The control unit is executed for example as a processor plus memory, register etc. The control unit has an interface with a transmitting unit (not shown), which transmits communications signals via the forward channel, and optionally other interfaces with higher network elements, e.g. with a television company for access to television signals, with an Internet service provider for access to the Internet or with a video server for access to video films.

The transmitting device 1 is designed for the synchronous multipoint-to-point CDMA network 2. The transmitting device 1 contains a unit 4 for generating a CDMA-coded communications signal and a unit 6 for generating a synchronization signal. The synchronization signal is coded by means of a synchronization code, which is not a CDMA communications code. The signal level of the synchronization signal is normally considerably lower, at least 10 dB, e.g. 20 dB lower than the aggregate signal level of the communications signals of the active terminal stations. The signal output of the synchronization signal can be varied dynamically, e.g. adaptively depending on the number of terminal stations locking on at the same time. The signal output is selected such that the sum of the signal outputs of all terminal stations locking on does not adversely affect the information transmission. The exchange can for example specify the signal output for the synchronization signals to be emitted subsequently via the forward channel present. Other information, such as a synchronization request, number of signals to be transmitted, collision resolution signals can also be preset via the forward channel. The synchronization signal in the back channel is emitted in the same transmission channel and/or in the same frequency range as the communications signal.

The transmitting device 1 also contains a modulator 7. The modulator 7 is used to modulate the coded synchronization signals. Modulation is executed for example using multiplication by +1 and −1. The modulator 7 is driven at a rate which corresponds to the symbol clock pulse of a spread communications signal. In the first clock pulse period, multiplication by +1 is performed, in the second clock pulse period multiplication by −1, in the third clock pulse period multiplication by +1 etc., i.e. alternatingly. Modulation ensures that the synchronization signals do not on average have any DC offset. The influence of the synchronization signals on the demodulation and decorrelation of the communications signals is thereby minimized.

A unit 5 is also provided. The unit 5 contains an electro-optical transformer, an HF transmitter or a transmitting aerial for a customer unit. The unit 5 optionally contains a switch, which prevents synchronization signals and communications signals from being sent simultaneously. Only synchronization signals are emitted for locking on, and only communications signals are sent during information transmission.

The receiving device 3 of the exchange is designed for the synchronous multipoint-to-point CDMA network 2 and accordingly contains a unit 18 for receiving and detecting a CDMA-coded communications signal and a unit 19 for receiving and detecting a synchronization signal.

The unit 18 contains a logical correlator 9 and an early/late correlator 11.

The logical correlator 9 is designed as a CDMA correlator. It is used to receive communications signals, and to detect the data contained in the communications signals. The detected data are supplied to an evaluation unit for further processing.

The early/late correlator 11 is used to generate the so-called tracking signal from the communications signals received. The tracking signal is used via the forward channel to fine-tune the phase of the communications signals to be sent by the terminal stations. Modulation of the synchronization signals on the transmitting side in particular ensures that the detection and production of the tracking signal is not adversely affected and no incorrect synchronization is caused thereby.

The unit 19 contains two arms, one arm containing a demodulator 12 and a logical correlator 13 and the other arm a demodulator 15 and a logical correlator 16. Demodulator 15 is driven by a first clock pulse. Demodulator 12 is driven by a second clock pulse. The first and second clock pulse have the same clock pulse frequency, but different phases. The first clock pulse corresponds to the symbol clock pulse of a coded communications signal. A delay element 17 is provided, which has a delay of half a clock pulse period. The first clock pulse is supplied to the delay element 17, in which it is delayed by half a clock pulse period. The second clock pulse is generated in this way.

Each demodulator 12 and 15 is suitable to carry out demodulation of the synchronization signals received using multiplication by +1 and −1. Demodulation thus takes place in the same manner as modulation on the transmitting side.

Each logical correlator 13 and 16 is used to correlate identical synchronization signals sent consecutively in time with a synchronization code which is not a CDMA communications code, and to accumulate the correlated synchronization signals inside these correlators to even out interference due to the communications codes of other terminal stations.

One path is sufficient in principle to detect the synchronization signals. A path contains a demodulator and a logical correlator, e.g. demodulator 15 and correlator 16. A received synchronization signal normally lies within a symbol clock pulse period. The delay of the synchronization signal is determined in the correlator 16.

An allowance is made for this delay thus measured in the next step for this transmitting device and it is thus compensated for, to guarantee the setting of the orthogonal communications code. All communications codes arriving in the receiving device 3 from various transmitting devices are thereby in a synchronous position in relation to one another. In rare cases, the synchronization signal received can also lie inside two clock pulse periods, to be precise when owing to the delay it arrives at the exchange just at the time at which a changeover of demodulation from +1 to −1 or vice-versa is taking place. Detection is then not possible due to multiplication of one part of the synchronization signal received by +1 and multiplication of another part of the synchronization signal received by −1.

To rectify this fault, a terminal station can e.g. of itself perform transmission of synchronization signals with another phase position after a certain period of time in which locking on has failed. For this purpose, the terminal station has a random number generator, which determines the phase position, or a delay element, which implements a delay of half a clock pulse period. The synchronization signals sent then arrive again in the exchange such that they lie completely within a clock pulse period and can then be detected.

In the first practical example, each terminal station can transmit at any time. The exchange guarantees that synchronization signals received at any time are detectable and thus locking on is possible. This is achieved by providing two paths. In one path, formed by demodulator 15 and correlator 16, demodulation is performed using a first clock pulse. In the second path, formed by demodulator 12 and correlator 13, demodulation is performed using a second clock pulse displaced by 180 degrees. The phases of the two clock pulses are separated by half a symbol clock pulse period, thereby ensuring that the synchronization signals received lie completely within a symbol clock pulse period at least in one path, and are thus detectable in at least one path.

Selector switch 14 forwards the detected synchronization signals of that path of which the output signal level exceeds a predetermined threshold value.

The signal level of each synchronization signal is specified directly by the exchange through the forward channel. Alternatively, the exchange specifies a maximum level, which may not be exceeded, so that indirect setting takes place. The exchange sets the signal level for example in such a way that the aggregate signal level of all synchronization signals sent at the same time is at least 10 dB lower than the aggregate signal level of all communications signals sent at the same time. To do this, the exchange measures all signal levels received via the back channel and calculates optimised signal levels from these, which levels are transmitted via the forward channel to the terminal stations. Measurement and subsequent transmission of the permitted signal level values are performed for example periodically in predetermined, so-called time slots. The signal-to-noise ratio of the communications signals received in the exchange may not be impaired by the synchronization signals, or only insignificantly, as otherwise a malfunction of the entire system may result. The synchronization signal is transmitted in the same transmission channel as the information signal.

A unit 8 is also provided. The unit 8 contains for example an optical/electrical transformer, an HF receiving unit or an aerial of a base station. The unit 8 also contains a splitter to divide the signals received and to convey the signals received to unit 18 and unit 19.

The terminal devices of the terminal stations which want to communicate via the multipoint-to-point CDMA network 2 are normally also described as set-top unit, set-top box, decoder, modem, terminal station or customer unit. Each terminal device contains the transmitting device 1, which is used to send the communications signals generated by the corresponding terminal station, e.g. request signals for the transmission of video films, so-called video on demand, or web pages from the Internet, and the synchronization signals generated by the corresponding terminal station for logging on and locking on at the exchange. Each terminal device also contains a control unit, not shown, which takes on the processing of the signals received via the forward channel. The control unit is executed for example as a processor plus memory, register etc. The control unit has for example an infrared interface for receiving request signals of a subscriber transmitted via a remote control and an interface with a television set and/or a computer for displaying the information received via the forward channel.

A synchronization procedure for the synchronous multipoint-to-point CDMA network 2 is described below.

The terminal stations, which are already locked on, transmit CDMA-coded communications signals to the exchange. The CDMA coding is effected by means of orthogonal codes. One or more individual codes are allocated to each terminal station, by means of which codes it encodes its information, i.e. data to be transmitted, prior to transmission. Codes from the family of Extended Preferentially Phased Gold Codes or the Walsh Hadamard Codes, which are available in different lengths, e.g. 128 chips, can be used as CDMA code.

While some terminal stations are now already locked on and transmit communications signals continuously to the exchange, each with different CDMA communication codes in a predetermined transmission channel, a terminal station which has not yet been synchronized can lock on at any time (or in time slots specified by the exchange) and simultaneously to the transmission of the communications signals of other terminal stations by generating a synchronization signal, which it transmits repeatedly consecutively in time to the exchange. The signal level of the synchronization signal here is lower than the signal level of the communications signal sent by a terminal station following synchronization. For example, the sum of the signal levels of the synchronization signals of all terminal stations locking on is 20 dB lower than the sum of the signal levels of the information signals of all terminal stations sending useful information. The result is that the synchronization signals only have a negligible adverse effect on the information transmission.

The synchronization signal is coded and modulated and transmitted in the same transmission channel and/or in the same frequency range as the information signal. Thus frames are no longer provided in which time areas are provided for the exclusive use of a certain transmission, but rather every terminal station is free to transmit its synchronization signals at any time, parallel to information signals sent simultaneously by other terminal stations.

In the exchange, the synchronization signal received is detected only by demodulation, logical correlation with a synchronization code, which is not a CDMA communications code, and then accumulation of the correlated synchronization signals.

A Barker code with a length of 11 chips is used for example as a synchronization code. The length of the synchronization code is thus shorter by at least a factor of five than the length of the CDMA communications code. Detection of the synchronization signals is thereby simplified. In addition, impairment of the information transmission is minimized by the shorter code. A synchronization signal can be generated simply for example by sending the Barker code at a preset signal output.

The accumulator function is implemented for example in a register or an integrator or the like.

Each logical correlator 13 and 16 is executed for example as a matched filter, which is coordinated to the synchronization code, e.g. Barker code.

When using coherent detection, first correlation and then accumulation takes place. When using quasi-coherent detection, squaring takes place following accumulation. When using non-coherent detection, first correlation, then squaring and then accumulation takes place.

The second practical example is now explained with the aid of FIG. 2. FIG. 2 shows a part of a receiving device according to the invention. The part corresponds to a unit for receiving and detecting synchronization signals and represents an alternative to unit 19 for receiving and detecting synchronization signals from FIG. 1. The unit of the second practical example contains a demodulator 20 and a logical correlator 21, which correspond in their assembly and function to the demodulator 15 or the correlator 16 from FIG. 1.

A changeover switch 22 and a delay element 23 are also provided.

Demodulator 20 is controlled by a first clock pulse, which corresponds to the first clock pulse from FIG. 1 and is supplied via changeover switch 22. This is the default setting. The first clock pulse is supplied furthermore to the changeover switch 22 via the delay element, which generates a delay of half a clock pulse period. In a second setting, the delayed first clock pulse is supplied to the demodulator 20 via changeover switch 22. This is the case if the synchronization signals received lie in two clock pulse periods and cannot be detected with the first clock pulse.

The demodulator 20 is thus driven by a clock pulse in which at least two phase positions can be set.

The invention claimed is:

1. A receiving device for a multipoint-to-point network, wherein the multipoint-to-point network is a synchronous multipoint-to-point CDMA network, containing a first unit for receiving and detecting a communications signal, in particular a CDMA-coded communications signal, and a second unit for receiving and detecting a coded synchronization signal, wherein the second unit contains a series circuit of a demodulator and a logical correlator and is used for demodulating and detecting the coded synchronization signal, said coded synchronization signal having a signal level which is lower than a signal level of the communications signal and/or is coded using a code which differs from a code of the communications signal, characterized in that the second unit contains two logical correlators connected in parallel for correlating the synchronization signal and two demodulators, that a first demodulator is connected in an incoming circuit to a first correlator and a second demodulator is connected in an incoming circuit to a second correlator, that the first demodulator is driven by a first clock pulse and that the second demodulator is driven by a second clock pulse, the second clock pulse having the same clock pulse frequency as the first clock pulse and a preset phase difference compared with the first clock pulse.

2. A receiving device according to claim 1, characterized in that a delay element with a delay of half a clock pulse period is provided, said delay element is used for generating the second clock pulse from the first clock pulse.

3. A receiving device according to claim 1, characterized in that each demodulator is suitable for carrying out demodulation using alternating multiplication by +1 and −1.

4. A receiving device according to claim 1, characterized in that a selector switch for selecting one of the outputs of the correlators is connected in series to the correlators.

5. A receiving device according to claim 1, characterized in that the first clock pulse corresponds to a symbol clock pulse of a coded communications signal.

6. A receiving device according to claim 1, characterized in that the demodulator is driven by a clock pulse in which at least two phase positions can be set.

* * * * *